United States Patent [19]

Dykstra et al.

[11] Patent Number: 5,388,176
[45] Date of Patent: Feb. 7, 1995

[54] DC MOTOR SPEED CONTROL SYSTEM

[75] Inventors: Richard A. Dykstra, Cedar Grove; Robert K. Mitchell, Brookfield, both of Wis.

[73] Assignee: Briggs & Stratton Corp., Wauwatosa, Wis.

[21] Appl. No.: 864,404

[22] Filed: Apr. 6, 1992

[51] Int. Cl.⁶ .............................................. H02P 5/17
[52] U.S. Cl. .................................. 388/811; 388/814; 388/903; 388/930; 318/139
[58] Field of Search .................... 388/803–815, 388/903, 930; 318/599–607, 139, 811

[56] References Cited

U.S. PATENT DOCUMENTS

| | | | |
|---|---|---|---|
| 3,719,876 | 3/1973 | Miller | 321/45 C X |
| 3,983,464 | 9/1976 | Peterson . | |
| 4,011,491 | 3/1977 | Grover et al. . | |
| 4,162,436 | 7/1979 | Waldorf et al. | 318/139 |
| 4,384,241 | 5/1983 | Stillhard | 388/811 |
| 4,480,216 | 10/1984 | Nakajima | 388/811 |
| 4,694,228 | 9/1987 | Michaelis | 318/599 |
| 4,734,629 | 3/1988 | Lessig, III et al. . | |
| 4,765,426 | 8/1988 | Shimizu | 318/293 |
| 4,791,544 | 12/1988 | Gautherin et al. | 323/901 X |
| 4,905,300 | 2/1990 | Bhagwat et al. | 388/816 |
| 4,910,447 | 3/1990 | Masters | 318/599 |
| 5,017,854 | 5/1991 | Gully et al. | 388/811 |
| 5,063,338 | 11/1991 | Capel et al. | 318/685 |
| 5,087,865 | 2/1992 | Nelson | 318/139 |
| 5,138,249 | 8/1992 | Capel | 323/283 |

OTHER PUBLICATIONS

Sears Owner Manual, 18-Inch Electric Lawnmower With Clip Handle, Dec. 19, 1990.
Black & Decker Cordless Power Mower Instruction Manual, Feb. 1991.

Primary Examiner—William M. Shoop, Jr.
Assistant Examiner—David Martin
Attorney, Agent, or Firm—Andrus, Sceales, Starke & Sawall

[57] ABSTRACT

A speed controller for a DC motor minimizes speed droop and load droop through pulse width or frequency modulation. The controller provides an extra power increase upon engine starting or whenever a heavier load is temporarily encountered. The control circuit also has a current limiter, overload indicators, and a battery recharger. The controller is very inexpensive, primarily because all of the timing components are contained on a single integrated circuit timer chip such as a 556 timer. The controller contains other features, including a circuit for limiting the pulse width of the control signal from the pulse width modulator.

50 Claims, 9 Drawing Sheets

| FUNCTION | 555 | 556(1) | 556(2) |
|---|---|---|---|
| GROUND | 1 | 7 | 7 |
| TRIGGER | 2 | 6 | 8 |
| OUTPUT | 3 | 5 | 9 |
| RESET | 4 | 4 | 10 |
| CONTROL V | 5 | 3 | 11 |
| THRESHOLD | 6 | 2 | 12 |
| DISCHARGE | 7 | 1 | 13 |
| $V_{CC}$ | 8 | 14 | 14 |

DC MOTOR SPEED CONTROL SYSTEM

BACKGROUND OF THE INVENTION

This invention relates to control systems for controlling the speed of DC motors. More particularly, this invention relates to control systems for battery-powered electric motors used in lawnmowers, snowblowers, and other lawn and garden equipment.

Due to concerns regarding air pollution, electric lawnmower motors are becoming increasingly popular as a replacement for small, internal combustion engines used on lawnmowers, snowblowers and the like. In particular, battery-powered motors are desirable instead of AC line-powered units due to the inherent operating limitations and safety problems when electric power cords are used.

A major disadvantage of typical prior art battery-powered motors is that the motor speed tends to be reduced or "droop" as the battery becomes discharged. When the motor speed drops below a certain level, the lawnmower output becomes too low for the lawnmower blade to effectively cut the grass.

Another problem with battery-powered lawnmowers occurs when the blade attempts to cut wet or heavy grass. The torque output of the motor is often insufficient to overcome the resistance of heavy or wet grass, thereby preventing the grass from being cut.

When the load increases as, for example, when the blade encounters heavy or wet grass, the current to the motor is increased in some prior art devices to compensate for the increased load. This increase in current may quickly discharge the battery unless it is controlled.

Prior art control systems exist for controlling the speed of electric motors. However, these control systems typically are complicated and expensive since they require many discrete components. Also, these prior art systems often are not capable of providing increased torque for short periods of time and they typically do not sufficiently protect the battery from unnecessary, premature discharge.

SUMMARY OF THE INVENTION

A control system is disclosed for controlling an electric motor that is connected to a load. The load may be a rotating blade such as that used in a lawnmower or snowblower. The motor is powered by a direct current voltage supply such as a 24-volt battery.

In a preferred embodiment, the control system includes a means for generating a supply feedback signal that is functionally related to a supply signal from the voltage supply. The preferred embodiment also includes an integrated circuit timer means having a means for generating a frequency signal, and a pulse width modulation means for receiving the frequency signal and the supply feedback signal and for outputting a switch control signal at a predetermined frequency whose pulse width is inversely proportional to the supply signal. The switch control means controls the switch means which in turn controls the voltage to the motor. Since the pulse width of the switch control signal is inversely proportional to the supply signal, as the supply signal and the battery voltage decrease, the pulse width increases. The pulse width is also proportional to the load, so that as the load increases, the pulse width increases to deliver more power to the load.

An alternate embodiment of the control system uses frequency modulation instead of pulse width modulation. In this embodiment, the control system still includes a means for generating a supply feedback signal that is functionally related to a supply signal from the DC voltage supply, and a timer means having a means for generating a frequency signal. A frequency modulation means receives the frequency signal and the supply feedback signal, and outputs a switch control signal having a set pulse width whose frequency is inversely proportional to the supply signal. The switch control means controls the switch means which in turn controls voltage to the motor. Since the frequency of the switch control signal is inversely proportional to the supply signal, as the battery voltage and the supply signal decrease, the frequency increases. As the frequency increases, the off-time between pulses of the switch control signal decreases. The frequency of the switch control signal is also proportional to the load so that the frequency increases to deliver more power to the load as the load increases.

To prevent an overload condition, both of the above embodiments of the present invention include a current limiter and an indicator which indicates when approximately 80% of the current limit has been reached. This load indicator allows the operator to reduce the load and conserve the energy of the DC power supply.

Both the pulse width and frequency modulated embodiments of the present invention may also include a unique starting circuit which provides more power to the motor for several seconds during starting until the motor reaches a predetermined speed. Both embodiments of the invention may also include a circuit for temporarily increasing the power to the motor when an increased load is sensed, such as heavy or wet grass. The invention may also include an automatic idler which reduces the motor speed to an idle speed when the load decreases or is removed.

The present invention includes other features, including a means for generating a load feedback signal that is used by the pulse width or frequency modulator to determine the pulse width or frequency of the switch control signal, respectively. Another optional feature includes a battery charger which senses the voltage supply output on every cycle of the transformer and which provides charging current to the voltage supply whenever the voltage of the supply signal is less than a predetermined level.

As an alternate method of preventing premature discharge of the battery, the pulse width modulated control system may include a means for reducing the frequency of the frequency signal by one-half if the pulse width of the switch control signal exceeds a predetermined value.

It is a feature and advantage of the present invention to provide a speed control system wherein motor speed droop is minimized as the battery voltage drops or when the load increases.

It is another feature and advantage of the present invention to temporarily increase motor current during starting or when the load increases.

It is yet another feature and advantage of the present invention to provide a control system in which all of the timing components are located on a single, integrated circuit chip.

It is yet another feature and advantage of the present invention to provide a control system having both a current limiter and an indicator that indicates when an overload condition is approaching but has not yet been reached.

It is yet another feature and advantage of the present invention to provide a control system having a battery recharger which provides charging current to the battery on every cycle, if needed.

These and other features and advantages of the present invention will be apparent to those skilled in the art from the following detailed description of the preferred embodiments and the attached drawings, in which:

BRIEF DESCRIPTION OF THE DRAWINGS

FIGS. 7(a) through 7(c) are timing diagrams relating to the circuit of FIG. 6.

DETAILED DESCRIPTION OF THE PREFERRED EMBODIMENTS

A primary purpose of the present invention is to provide a low-cost controller for maintaining DC motor speed in battery-powered applications. Without any motor controller, the speed of the motor would decrease as the battery voltage decreases. In some prior art devices, the motor must be selected such that its no-load speed is excessively high with a fully-charged battery so that the motor may still work properly at lower battery voltages. On the other hand, the present invention maintains the motor speed throughout a relatively wide battery voltage range.

The present invention uses voltage-controlled-oscillator circuitry to maintain the motor speed as the battery voltage decreases. As the battery voltage decreases, either the frequency or the pulse width of a switch control signal changes to control a power semiconductor. The switch control signal controls the turning on and off of the power semiconductor to offset the reduced input voltage to the timer control circuit. Speed droop can also be minimized as the motor load increases by using an optional load current feedback signal derived from the power semiconductor, a feedback resistor, or otherwise.

In a preferred embodiment using pulse width modulation, the pulse width modulation circuitry uses a 556 integrated timer circuit to provide the control pulse train to the power semiconductor. The 556 timer has two 555 timer sections. The first timer section sets the frequency of the output pulse train. This output pulse train is of a predetermined frequency and is input to the second timer section. Also input to the second timer section is a load feedback signal and a supply signal from the battery power supply. As the battery voltage decreases, the voltage to the second timer section's RC timing network decreases more than the timer's control voltage signal at pin 11. As a result, the output pulse width increases as the battery voltage decreases. The increase in pulse width helps maintain a nearly constant average motor input voltage as the battery voltage is reduced.

The load feedback signal, which is present as a control voltage on pin 11 of the timer, is proportional to load current. As the load current increases, the control voltage input at pin 11 increases, thereby increasing the pulse width of the switch control signal. The increase of the pulse width keeps the power switch on for longer periods of time, thereby minimizing DC motor speed droop as the load increases.

The present invention also includes several optional features which may be desirable for a particular application. All of the optional features may be used with either the pulse width or frequency modulated embodiments of the present invention.

One of the features is the use of the load current feedback signal to provide current limiting for the system. See FIG. 1.

Figure 3:
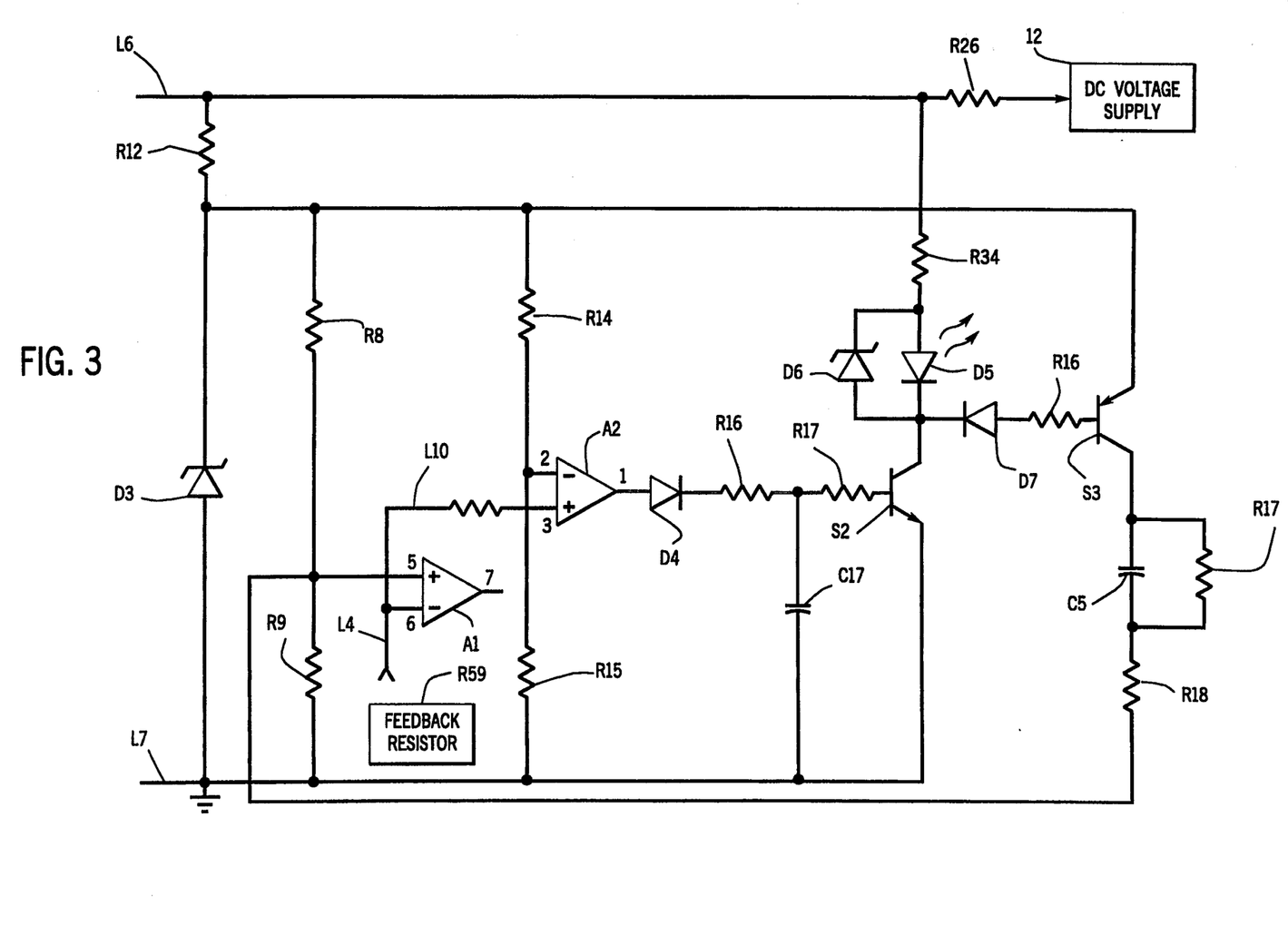
FIG. 3 is a schematic diagram of an optional subcircuit for temporarily providing increased power and for indicating when an overload condition is approaching. This subcircuit may be used in the embodiments depicted in FIGS. 1 and 11.
Figure 4:
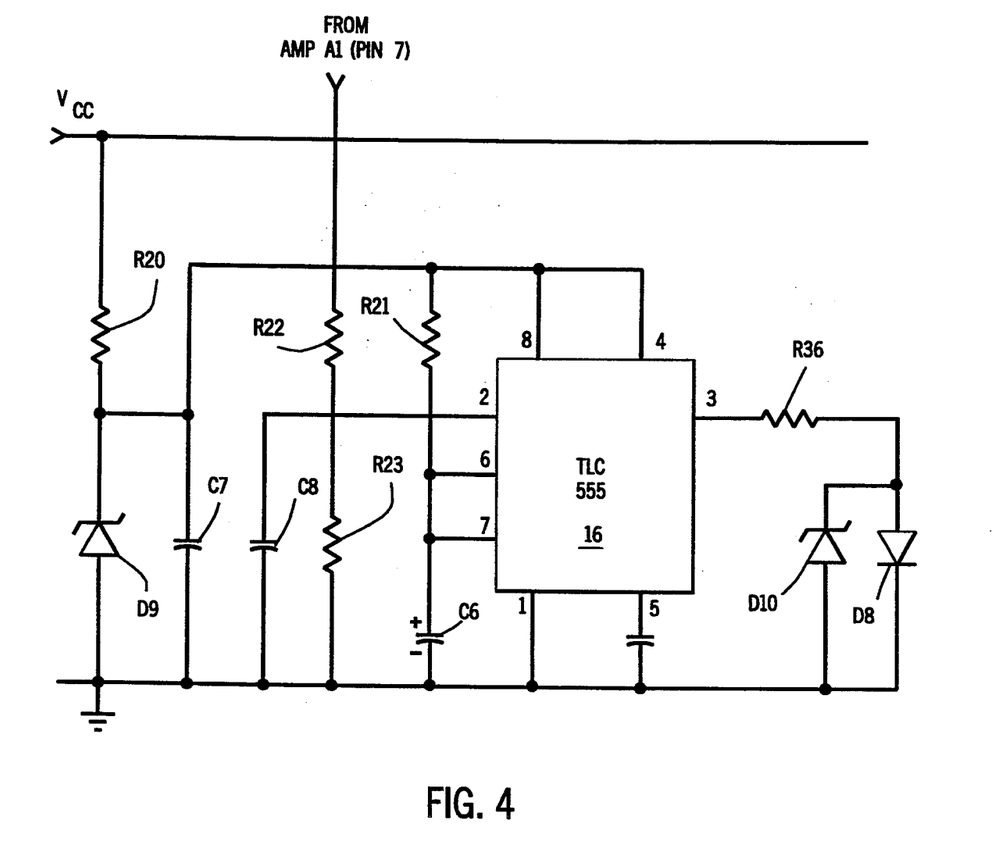
FIG. 4 is a schematic diagram of an overload circuit which may be used in place of the one depicted in FIG. 3.

Another feature is to provide an audible or visual indicator whenever the load reaches a predetermined value which is less than the current limit, such as 80% of the maximum current. FIG. 3 depicts one circuit for indicating when an 80% load condition has been achieved. FIG. 4 depicts an alternate circuit which indicates when a 100% load condition has been achieved.

Another feature of the present invention is to provide increased power to the electric motor during starting and when the load -such as a rotating blade-meets an unusually high resistance such as heavy or wet grass. These features are incorporated into the schematic depicted in FIG. 3.

FIGS. 6, and 7(a) through 7(c) relate to another feature of the present invention, namely where the pulse width of the switch control signal is limited to a maximum value to override a feature of the 556 timer. Without these circuits, the 556 timer will reduce the frequency of the switch control signals to one-half of the predetermined frequency if the pulse width of the switch control signal exceeds a particular value.

Figure 8:
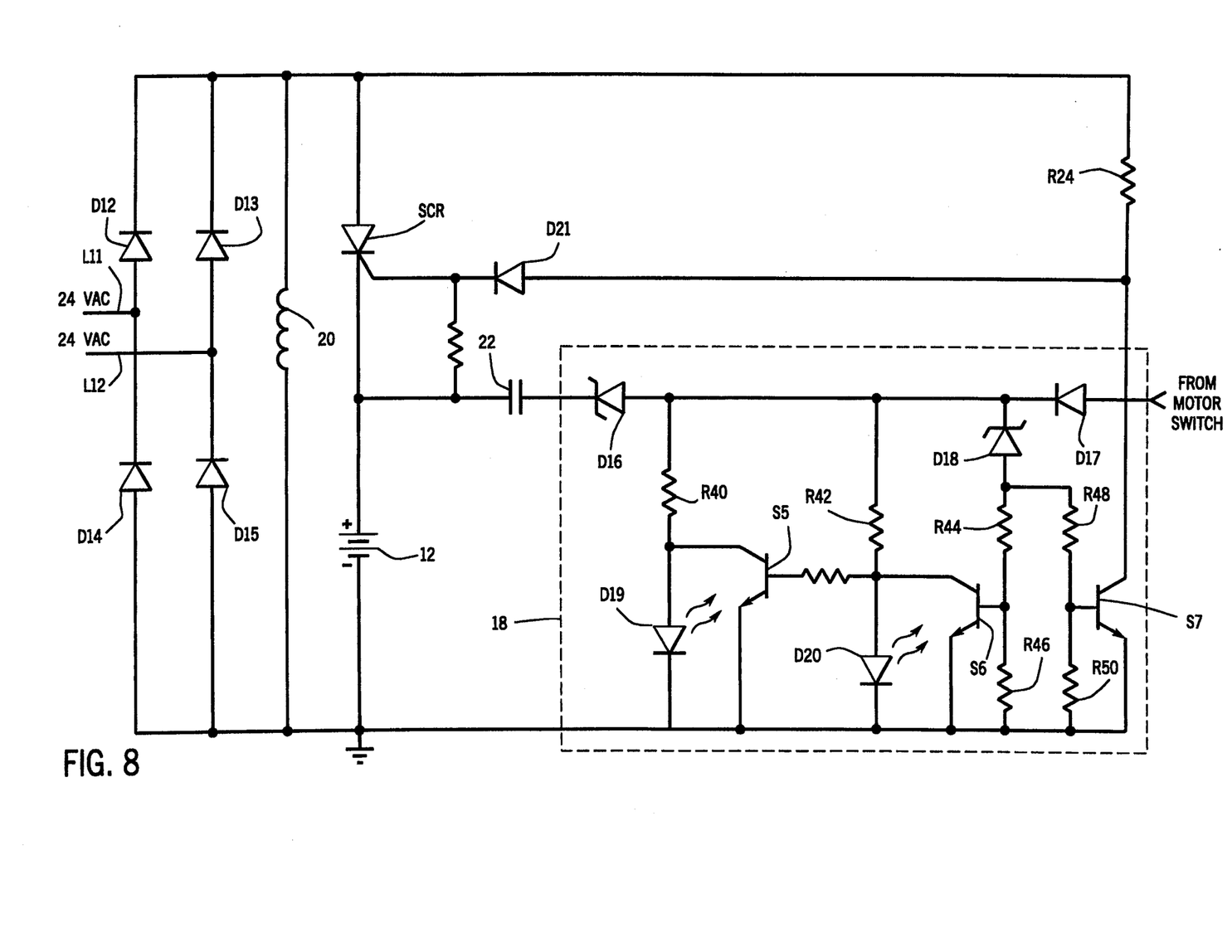
FIG. 8 depicts an optional battery charger which may be used with any of the embodiments of the present invention.
Figure 9:
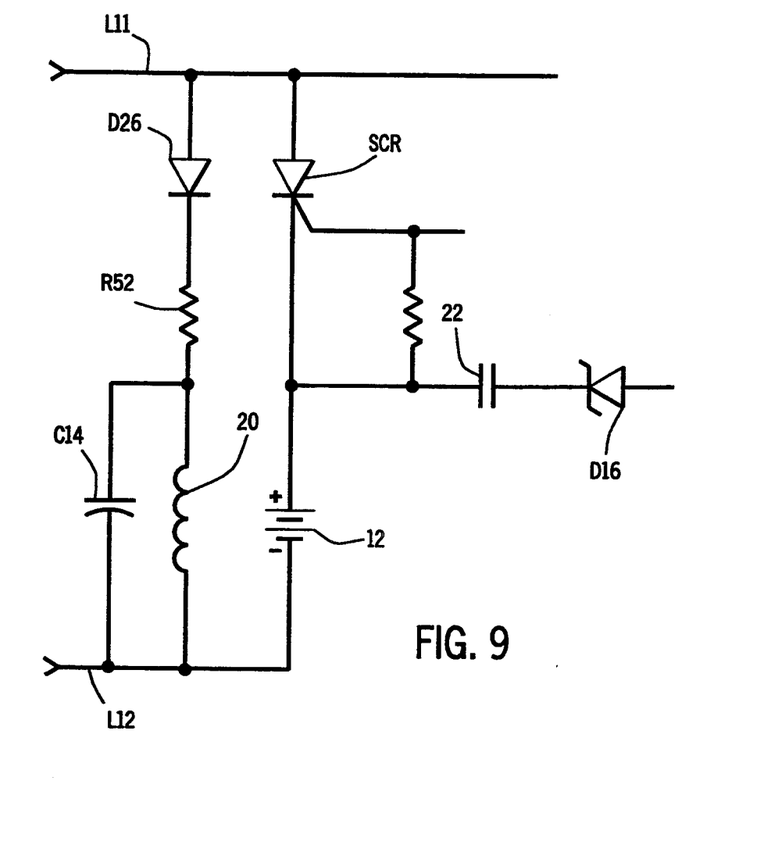
FIG. 9 depicts a subcircuit which may be used with the bridge rectifier in FIG. 8 to provide smoother DC voltage for the relay coil.
Figure 10:
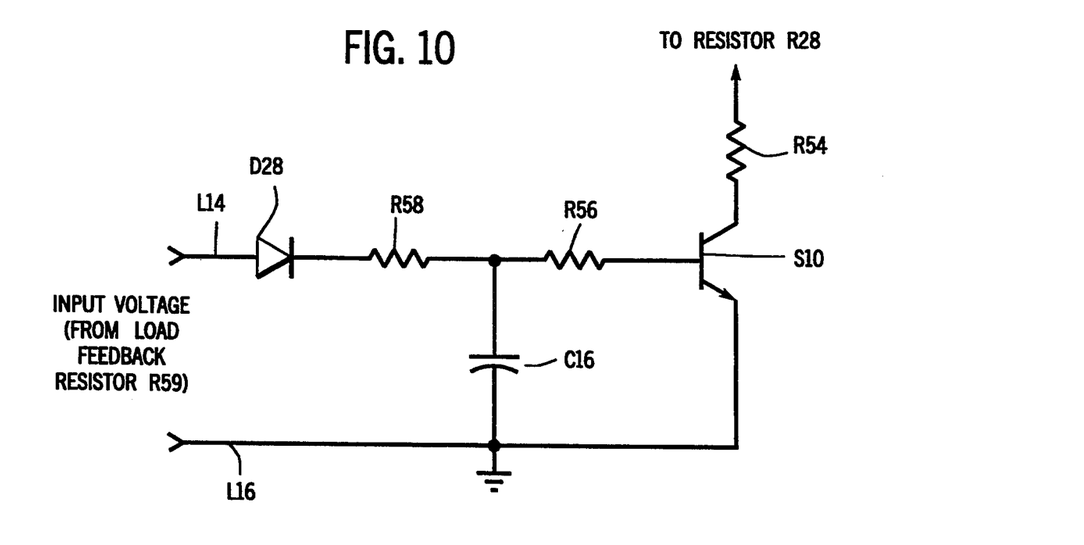
FIG. 10 is a schematic diagram of an optional automatic idling circuit which may be used with any of the embodiments of the present invention.
Figure 11:
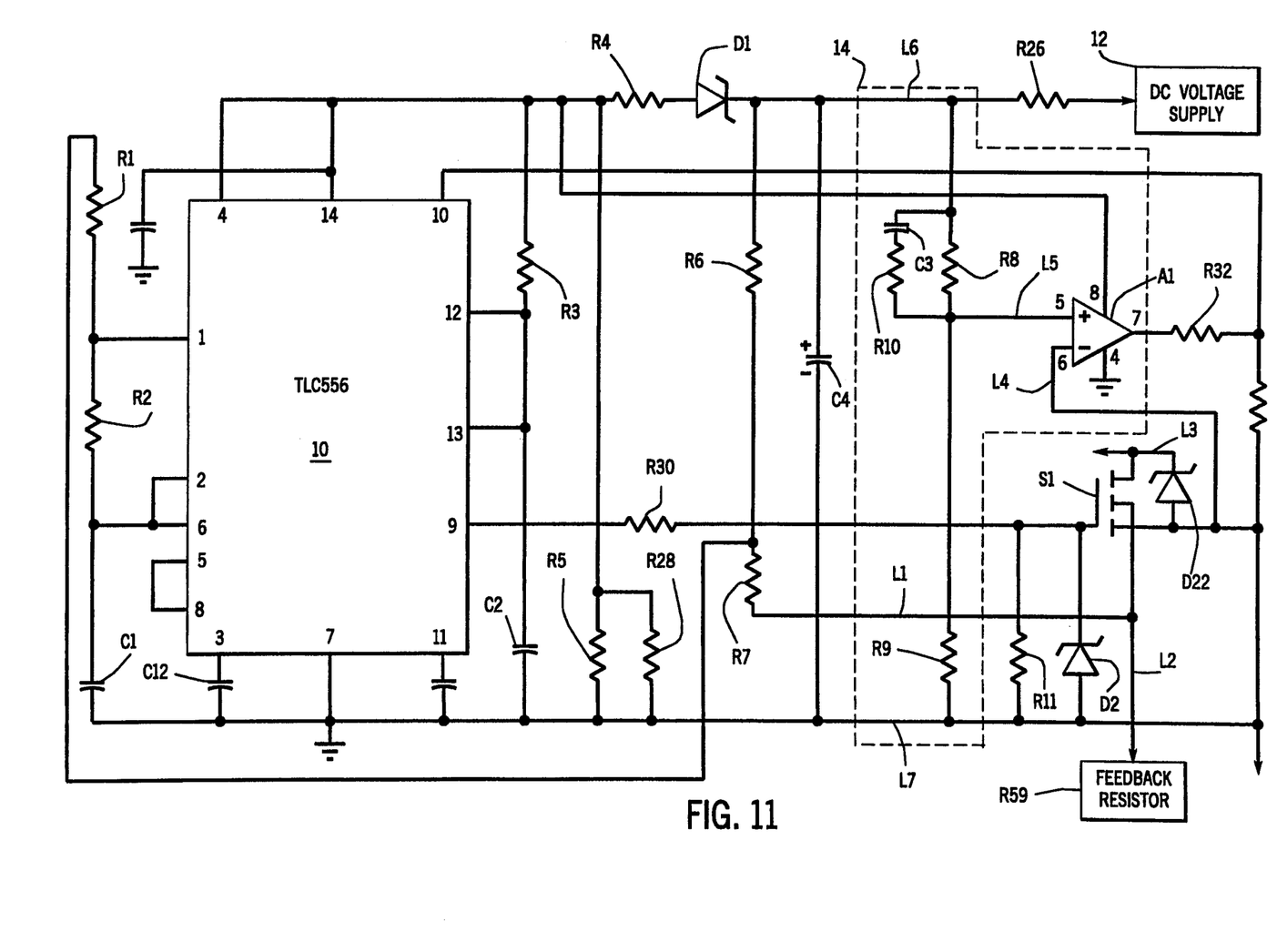
FIG. 11 is a schematic diagram of an embodiment of the present invention using frequency modulation.

The present invention may also include a battery charger with a battery voltage indicator, like that depicted in FIG. 8. FIG. 9 depicts a modification of the schematic of FIG. 8 which provides a smoother DC signal to the relay coil. FIG. 10 depicts an optional automatic-idler circuit. FIG. 11 depicts the frequency modulated embodiment of the present invention.

Figure 1:
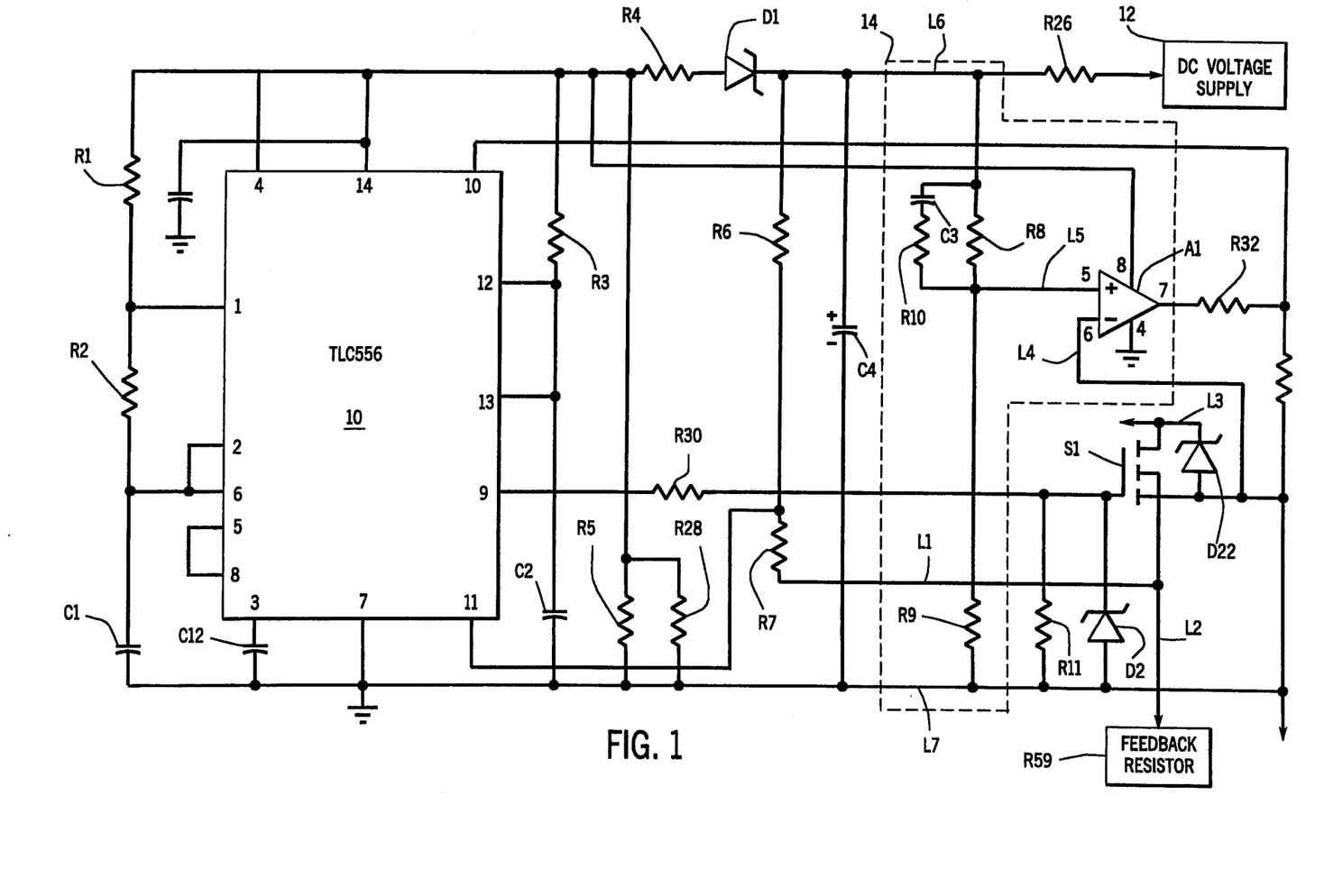
FIG. 1 is a schematic diagram of a preferred embodiment of the present invention using pulse width modulation.
Figure 2A:
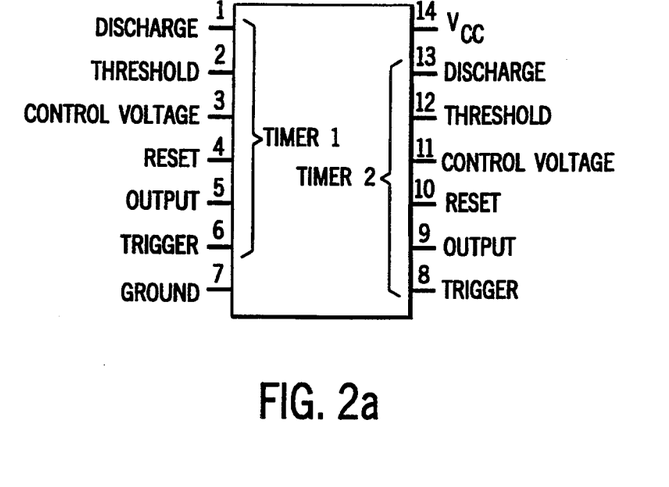
FIG. 2(a) is a pin diagram of a 556 timer which may be used in the circuits of FIGS. 1 and 11.
Figure 2B:
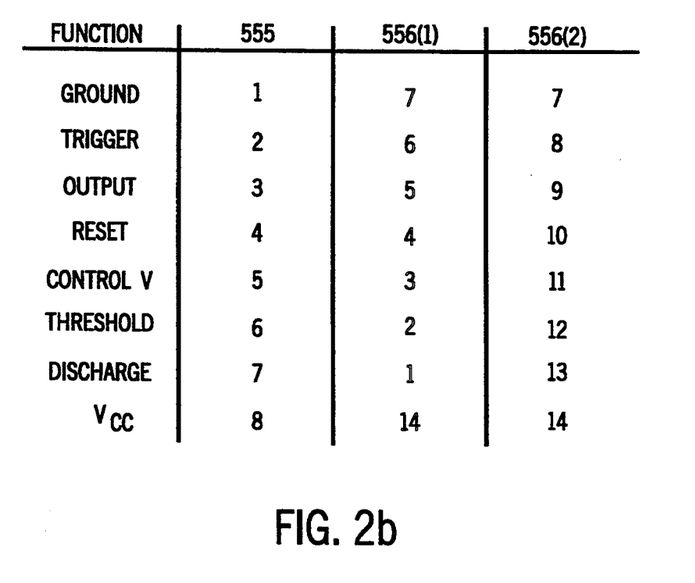
FIG. 2(b) is a cross reference chart listing the pin assignments if two 555 timers are used in place of the single 556 timer of FIG. 2(a).

Referring now to FIG. 1, a 556 timer 10 includes two 555 timers which are externally connected. Two 555 timers may be used in place of the 556 timer. The output of the first 555 timer section serves as an input to the second 555 timer section. The pin assignments for the 556 timer are depicted in FIGS. 2(a) and 2(b).

The first timer section, whose pins are located on the left-hand side of the 556 timer in FIG. 1, sets up the frequency of the switch control signal. This frequency is determined by an RC timing circuit consisting of resistors R1 and R2 and capacitor C1. The timing signal is input at pins 1, 2 and 6 of the first timer section of the 556 timer. The first timer section then processes the signal and outputs a pulse train of a predetermined frequency at pin 5, which is connected to a trigger input pin 8 of the second timer section.

The second timer section also has a resistor-capacitor timing network, consisting of resistor R3 and capacitor C2. The resulting second timing signal is input to pin 13. The input to this RC timing network is derived from a DC voltage supply 12 through a resistor R26. The voltage supply is preferably a 24-volt battery for a typical lawn and garden application. However, a lower voltage battery may be used in other applications. The supply signal from voltage supply 12 is reduced to about 18 volts by zener diode D1, and by a voltage divider consisting of resistors R4, R5 and R28. The resulting supply voltage for the RC timing network consisting of resistor R3 and capacitor C2 is typically about 14 to 15 volts.

One of the control signals which determines the output pulse width of the switch control signal is derived from the supply signal of voltage supply 12 via a voltage divider consisting of resistors R6 and R7. This supply voltage feedback signal is applied to pin 11 of timer 10.

Pin 11 also receives a load feedback signal from a load feedback resistor R59 via lines L1 and L2. Feedback resistor R59 has a very low resistance, on the order of 0.05 ohms. Both the load feedback signal and the supply feedback signal are applied to pin 11, and are processed to determine the pulse width of the output signal at pin 9 which is transmitted to a power semiconductor switch S1 through a resistor R30. Switch S1 is preferably a power metal oxide semiconductor field effect transistor (MOSFET), although other switches may be used. Switch S1 has a zener diode D22 connected across it to protect it from high voltages.

The timer output at pin 9 controls the switching of switch S1 so that as the pulse width of the square wave signal present at pin 11 is increased, the time that switch S1 is ON is increased, and thus the power applied to the motor via lines L2 and L3 is increased. Lines L2 and L3 must be made from a relatively heavy wire since they may typically conduct 20 Amps or more of current.

The present invention enables the pulse width to be changed as the battery voltage changes since two separate power supplies are used for the second timer section of the 556 timer. One power supply is used for the RC timing network consisting of resistor R3 and capacitor C2, as discussed above. A separate power supply is used to provide the feedback signal to pin 11, and includes resistors R6 and R7 as well as voltage supply 12. As the battery voltage decreases, the voltage to this RC timing network decreases more than the timer's control voltage signal present at pin 11. As a result, the output pulse width at pin 9 increases as battery voltage decreases. This increase of the pulse width helps maintain a nearly constant average motor input voltage even though the battery voltage is reduced.

As the load current increases, the control signal input at pin 11 also increases. As a result, the pulse width of the switch control signal present at pin 9 increases as the motor load current increases, thereby minimizing speed droop as a function of motor load.

The load current feedback signal present on line L2 is also used to provide current limiting. This feedback signal is applied via line L4 to input 6 of an operational amplifier comparator A1. Comparator A1 has a reference signal applied to it at pin 5 via line L5. The reference signal is derived from the supply signal of voltage supply 12. This supply signal is divided by a voltage divider consisting of resistors R8 and R9. When the voltage that is produced by the load current exceeds the reference voltage, comparator A1 switches from a high state to a low state and sends a low state output signal through resistor R32 to pin 10 of timer 10, which resets the second timer section of timer 10. The resetting of the second timer section causes the switch control signal output at pin 9 to go to a low state, thereby preventing switch S1 from conducting. When switch S1 does not conduct, power to the motor is switched off and the motor current is limited. Since the control signals are continuous, the timer may be reset whenever the load current is exceeded, rather than waiting for the timer to continue its timing cycle.

Referring again to timer 10, pin 14 is the power input to the timer, pin 7 is grounded, and pin 3 provides the control signal for the first timer section. Capacitor C12 connected to pin 3 is a filter capacitor.

The present invention also includes a means for increasing motor current during starting by increasing the reference voltage signal applied to pin 5 of comparator A1. The reference signal is proportional to the motor limit current. The reference voltage is increased by placing a capacitor C3 and a resistor R10 across divider resistor R8. During engine starting and before capacitor C3 has charged, the reference voltage present on line L5 is increased since the input voltage is not divided by resistors R8 and R9. After several seconds, capacitor C3 is fully charged and the reference voltage decreases to its normal level.

Capacitor C4 is a filter capacitor which filters the supply signal from voltage supply 12. Diode D2 and resistor R11 protect the control input of switch S1 from transient voltages and the like to insure that the switch has proper switching characteristics.

FIG. 2(a) is a pin assignment diagram of the 556 timer depicted in FIG. 1. FIG. 2(b) is a cross reference chart which lists the pin assignments if two 555 timers are used in place of a single 556 timer. The second column lists the pin assignments corresponding to the first 556 timer section, and the third column lists the pin assignments corresponding to the second 556 timer section.

The circuit depicted in FIG. 3 may be used in place of subcircuit 14 of FIG. 1. Some conductive lines have been eliminated from FIG. 3 for purposes of simplicity. For example, lines L4, L8, L9 and L10 have been eliminated. In FIGS. 1 and 3, as in all the Figures, components having corresponding functions have been given the same alphanumerical designations.

One of the features of the circuit in FIG. 3 is that it provides a visual indication when the motor is drawing about 80% of its current limit. After this point, the motor speed starts to drop off more dramatically when a heavy load is applied to the motor. By knowing when this point has been reached, the load may be lessened to reduce the rate of battery discharge. For example, if the load is a rotating lawnmower blade, the mower may be set to cut a narrower width or the height of the mower deck may be raised to lessen the resistance on the blade.

As discussed above in FIG. 1, the reference voltage used to determine the maximum current is derived from the battery supply. As the battery voltage decreases, the reference voltage also decreases in the circuit in FIG. 1. The current limit could drop too low to allow the motor to run at an useful speed. To prevent the reference voltage from dropping as the battery voltage decreases, the circuit in FIG. 3 includes a zener diode D3 and a resistor R12 connected between voltage supply 12 and comparator A1 to provide a constant reference voltage to input 5 of comparator A1. A voltage divider consisting of resistors R8 and R9 is also connected to the reference signal input of comparator A1. The other input to comparator A1 is derived from the feedback resistor as in FIG. 1. The output of comparator A1 at pin 7 is connected to pin 10 of timer 10 as in FIG. 1.

The 80% load indicator includes an operational amplifier A2 whose reference voltage is derived from a voltage divider consisting of resistors R14 and R15. If the resistances of resistors R8 and R14 are the same, then the resistance of resistor R15 would be about 20% lower than the resistance of resistor R9, thereby setting the reference voltage for comparator A2 to be about 20% less than the reference voltage input to comparator A1.

The other input to comparator A2 is obtained from feedback resistor R59 via line L10. When the feedback voltage signal reaches about 80% of the current limit, the output at pin 1 of comparator A2 switches from a low state to a high state and cause an NPN transistor switch S2 to conduct. Diode D4, resistors R16 and R17, and capacitor C17 provide signal conditioning to give switch S2 the proper switching characteristics.

When transistor switch S2 conducts, a light emitting diode (LED) D5 conducts through resistor R34 and begins to blink, indicating that an 80% load condition has been reached. A shunting zener diode D6 is connected across LED D5 to protect diode D5 from excessive reverse voltage.

The circuit depicted in FIG. 3 also provides a power increase for a predetermined period of time upon initial starting of the motor or whenever a heavier load condition occurs. The power increase is achieved by increasing the current to the motor by about 25% for a short period of time without having a continuously higher current limit which could cause excessive component heating. The power increase subcircuit in FIG. 3 replaces the power increase circuit in FIG. 1 consisting of resistor R10 and capacitor C3.

In FIG. 3, the power increase circuit includes a PNP transistor switch S3, a diode D7, a resistor R16, and an RC timing network consisting of resistors R17 and R18 and capacitor C5.

The power increase circuit operates in the following manner. When an 80% load condition is reached, switch S2 conducts, causing switch S3 to also conduct. The conducting of switch S3 places the RC timing network of resistors R17 and R18 and capacitor C5 across resistor R8. While capacitor C5 is charging, the RC network increases the reference voltage at pin 5 of comparator A1, thereby increasing the maximum current limit. When capacitor C5 becomes completely charged, the RC timing network essentially acts like an open circuit with respect to resistor R8, causing the reference voltage of comparator A1 to return to its normal level. If the load drops below 80% of maximum load current, capacitor C5 discharges through resistor R17, and resets the circuit so that the next time transistor S3 is turned on, the capacitor will charge again to cause the reference voltage to increase for a predetermined period of time, typically two to three seconds. Thus, the circuit in FIG. 3 provides a power increase both upon initial starting of the motor and when a heavier load condition is sensed, whereas the power increase circuit in FIG. 1 only provides a power increase during motor starting.

FIG. 4 is a schematic of an alternative to the load indicating circuitry in FIG. 3. The circuit in FIG. 4 provides an indication of a 100% overload condition, and is more expensive than the circuit depicted in FIG. 3 since the circuit in FIG. 4 uses an additional 555 integrated circuit timer.

In FIG. 4, the output at pin 7 of op amp A1 becomes the control input at pin 2 of 555 timer 16. As long as no overload condition exist, the output from comparator A1 is at a high state so that the control input to timer 16 is also at a high state. When an overload condition is reached, the output at pin 7 of comparator A1 goes to a low state, which resets the second portion of the 556 timer of FIG. 1, but also starts the timing of the 555 timer. The output of the 555 timer at pin 3 drives a light emitting diode D8 through a resistor R36. Resistor R20 and zener diode D9 provide a constant supply voltage to pins 4 and 8 of timer 16.

The output pulse width of timer 16 is set by an RC timing network consisting of resistor R21 and capacitor C6. Capacitor C7 is a filter capacitor for the power supply. Capacitor C8 is a filter capacitor for the output of amp A1, which output is divided by a voltage divider consisting of resistors R22 and R23. Diode D10 protects LED D8 from excessive reverse voltage.

When the motor current has not reached its limit, the output at pin 7 of amp A1 is at a high state. As a result, the input at pin 2 of timer 16 stays at a high state, causing the timer output at pin 3 to stay low and causing the LED to remain off. When an overload condition exists, the output of amp A1 goes to a low state momentarily, causing the input of timer 16 to go to a low state. This causes the timer output to go to a high state for a predetermined time period, and causes the LED to blink until the motor load again becomes sufficiently low so that the current limit of the control circuitry is not reached.

Figure 5:
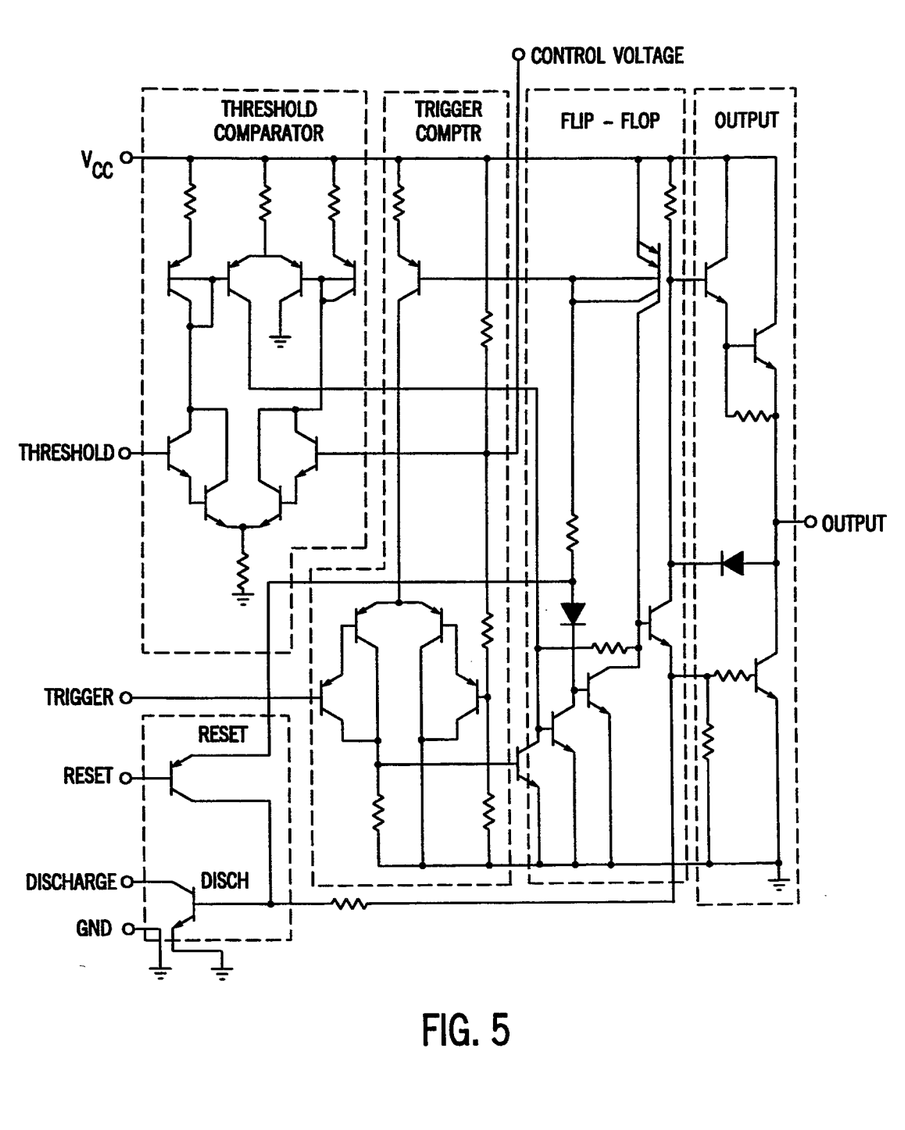
FIG. 5 is a schematic diagram of the 555 timer depicted in FIG. 4.

FIG. 5 is a schematic diagram of a typical 555 timer which may be used with the circuit in FIG. 4. FIG. 5 depicts a schematic diagram of a Motorola part number MC1555 timer. Two 555 timers like the one depicted in FIG. 5 may be used in place of the 556 timer of FIG. 1.

Figure 6:
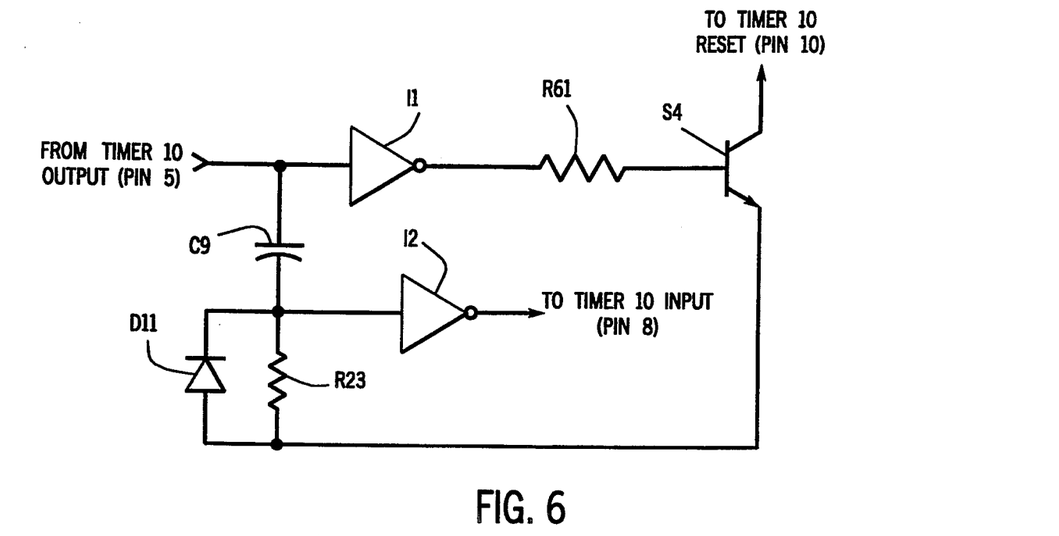
FIG. 6 is a subcircuit for resetting the 556 timer in FIG. 1.
Figure 7A:
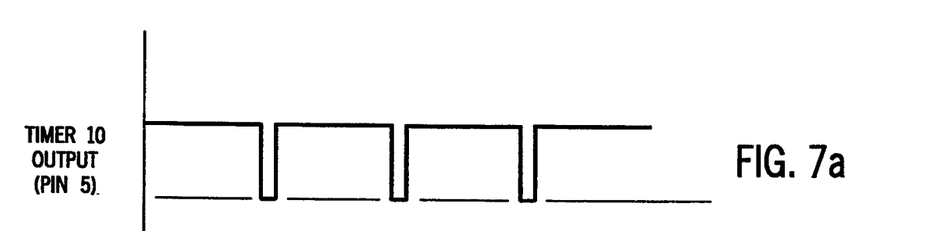
FIG. 7(a) depicts the output at pin 5 of the 556 timer shown in FIG. 1.
Figure 7B:
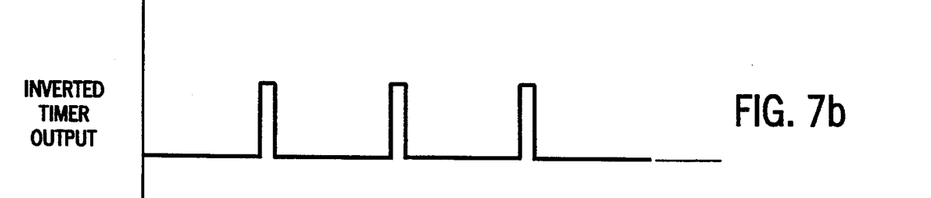
FIG. 7(b) depicts the timer output after it has been inverted by inverter I1 of FIG. 6.
Figure 7C:
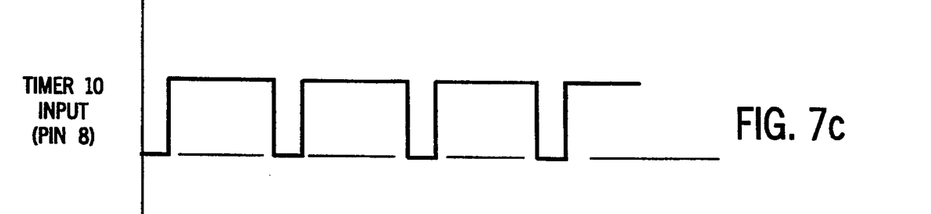
FIG. 7(c) depicts the input to pin 8 of the 556 timer in FIG. 1 if the circuit in FIG. 6 is also used.

FIGS. 6 and 7 relate to another feature of the present invention. The circuit depicted in FIG. 6 limits the maximum power MOSFET ON time during each cycle, thus preventing the switch control voltage output from the 556 timer in FIG. 1 from going to one-half of the known frequency when the supply voltage drops below a predetermined level or when the motor load increases above a predetermined level. Without the circuit in FIG. 6, the 556 timer will automatically reduce the predetermined frequency of its output signal to one-half or by another factor to prevent excessive battery drain. The circuit in FIG. 6 prevents excessive battery drain by limiting the ON time of the power MOSFET instead of reducing the switching frequency.

The circuit in FIG. 6 limits the power MOSFET ON time by resetting the second timer section of the 556 timer of FIG. 1. The resetting is accomplished by bringing the reset pin 10 of the 556 timer to a low state briefly during each cycle. The circuit in FIG. 6 also includes a differentiator circuit to condition the output at pin 5 of the first timer section of timer 10, thereby causing the second timer section to start its timing cycle during the positive-going portion of the first timer's output signal.

The differentiator consists of capacitor C9, diode D11, resistor R23, and inverter I2. Since the second timer cycle has to start on a positive-going portion of the timer output at pin 5, such a positive-going signal must be present at pin 8 of timer 10 after the second timer section is reset. This positive-going signal is obtained by generating a voltage in the differentiator circuit, and by inverting it via inverter I2. FIG. 7(c) depicts a timing diagram corresponding to the input at pin 8 of timer 10.

FIG. 7(a) is a timing diagram depicting the timer 10 output at pin 5. FIG. 7(b) is a timing diagram depicting the inverted timer output from inverter I1. Resistor R61 limits base current to switch S4. The high state inverted timer output signal turns on a transistor switch S4 which, when in its ON state, causes pin 10 of timer 10 to go to a low state to reset the second timer section of timer 10. The resetting of the second timer limits the pulse width of the switch control signal discussed above in connection with FIG. 1.

FIG. 8 depicts a battery charger with a voltage indicator which may be used to recharge the DC voltage supply of FIG. 1. In FIG. 8, alternating current is provided to the charger via lines L11 and L12. The alternating current is rectified by a full-wave bridge rectifier consisting of diodes D12, D13, D14 and D15. The rectified current is provided to the anode of an SCR whose cathode is directly connected to battery 12. The charger also includes an indicator circuit 18 which operates both while the motor is running and while the battery is charging. The indicator circuit has one LED D19 which indicates when the battery is sufficiently charged, and another LED D20 which indicates that the battery needs to be charged. Both LED's may be part of a single three-pin package.

The battery charger also includes a relay having a relay coil 20 and relay contacts 22. The relay contacts are open when the charger is disconnected from the battery. While the battery is being charged, the relay contacts 22 are closed which enables indicator circuit 18 to operate through a zener diode D16. When the motor is running but the battery is not being charged, relay contacts 22 are opened, but the indicator circuit still operates since current is supplied to the indicator circuit via diode D17.

The relay coil and relay contacts of FIG. 8 may be replaced by two extra shorting pins on the connector that provides power from the battery charger to the battery.

When the battery voltage is low and the relay contacts are closed, zener diode D18 does not conduct, thereby preventing transistor switches S6 and S7 from being turned ON, and turning ON switch S5. While switch S5 is conducting, a green LED D19 remains OFF, and a red LED D20 is ON. The turning ON of the red LED indicates that the battery voltage is low.

A resistor R40 is connected in series with LED D19; similarly, a resistor R42 is connected in series with LED D20. A voltage divider consisting of resistors R44 and R46 is connected to the base of switch S6. A voltage divider consisting of resistors R48 and R50 is connected to the base of switch S7.

When the threshold voltage of zener diode D18 is exceeded, transistor S6 is switched ON before transistor S7 is switched ON. The turning ON of switch S6 shunts the signal from red LED D20, thereby turning off the red LED. The shunting of the signal around diode D20 keeps switch S5 off as well, thereby causing green LED D19 to turn ON.

In FIG. 8, when the battery voltage is low, the output from the voltage bridge rectifier goes through a resistor R24 and a blocking diode D21, and then to the control input of the SCR as long as the battery voltage is below the selected voltage value determined by diodes D18 and D16. When the battery voltage exceeds this predetermined value, transistor switch S7 conducts and shunts the control current so that the control current does not go to the control input of the SCR. The control current will then pass through transistor S7 and the SCR will be prevented from switching ON. The battery voltage is sensed on every cycle of the input transformer, and the charger is coupled to the battery whenever the battery voltage is below the predetermined value.

When the battery charger is connected to the battery, maximum available charging current is provided until the battery reaches a predetermined voltage, typically between 27.2 to 27.6 volts for a 24-volt system. At that time, charging current tapers off to whatever charging current value is needed to maintain the battery.

As long as the battery voltage while the battery is charging is less than a threshold value of about 26.8 to 27.2 volts, the red LED remains ON. When the battery voltage exceeds this threshold voltage, the red LED turns OFF and the green LED turns ON.

When the motor is running, indicator circuit 18 is connected to the battery through diode D17. In this mode, the green LED will stay ON at battery voltages exceeding about 21 volts. The red LED will go ON and the green LED will go OFF when the battery voltage is less than about 21 volts.

FIG. 9 is a subcircuit which may be used in conjunction with the bridge rectifier of FIG. 8. The bridge rectifier provides a pulsed DC current instead of a constant DC current. The circuit in FIG. 9 provides a smoother DC voltage for relay coil 20 by means of diode D26, resistor R52, and capacitor C14.

FIG. 10 depicts an automatic idle circuit which may be used with either of the embodiments depicted in FIGS. 1 and FIG. 11. The circuit in FIG. 10 slowly reduces the motor speed to a lower idle speed when a no load or a light load condition exists.

In FIG. 10, the input voltage from feedback resistor R59 enters the circuit via lines L14 and L16. As long as the motor load current is above a threshold value determined by the conducting voltages of diode D28 and transistor S10, the feedback voltage supplied to the circuit causes transistor switch S10 to conduct. As a result, resistor R54 is then connected across the motor control's calibration resistor R28 (FIGS. 1 and 11), thereby increasing the motor speed.

When the feedback voltage input via lines L14 and L16 becomes too low for switch S10 to conduct, the motor speed slowly returns to a lower value as capacitor C16 discharges through resistor R56 and switch S10, slowly turning OFF switch S10. Resistor R58, in conjunction with diode D28, resistor R56 and capacitor C16, is used to filter the input feedback voltage waveform.

FIG. 11 is a schematic diagram of the frequency modulated embodiment of the present invention. In this embodiment, the frequency of the switch control signal to switching transistor S1 is modulated instead of using pulse width modulation as described above in connection with FIG. 1. FIG. 11 has essentially the same components as the circuit depicted in FIG. 1 and corresponding components have been given the same designations. However, some of the connections between components and connections to timer 10 have been changed to achieve frequency modulation instead of pulse width modulation.

More specifically, the circuit in FIG. 11 is configured such that the first timer section of timer 10 has one power supply for the control voltage at pin 3, which power supply provides power to the first timer section at pin 14. The first timer section has a separate power supply for the RC timing network consisting of resistors R1 and R2 and capacitor C1. By comparison, the pulse width modulated version depicted in FIG. 1 uses the same power supply for both the RC timing network and the control voltage of the first timer section.

In FIG. 11, the feedback resistor is connected via line L1 to the RC timing network of the first timer section, instead of being connected to the control input pin 11 of the second timer section as in the pulse width modulated embodiment.

In the pulse width modulated version, a first power supply is used to power the RC timing network for the second timer section—consisting of resistor R3 and capacitor C2—but a separate supply voltage is used to provide the control voltage for the second timer section at pin 11. The second supply voltage is in part provided by the load feedback resistor.

In the frequency modulated version depicted in FIG. 11, the second timer section uses the same supply voltage for both its RC timing network and its control voltage at pin 11. This configuration yields a constant pulse width regardless of the battery voltage.

The frequency modulated version depicted in FIG. 11 operates in the following manner. As the supply signal from DC voltage supply 12 decreases, the control voltage for the first timer section decreases at a greater proportional rate than the supply voltage to the RC timing network for the first timer section. This disproportionate control voltage decrease causes the timing cycle for the first timer section to increase in frequency as the DC voltage supply signal from supply 12 decreases, resulting in frequency modulation of switch S1. The higher switching frequency of switch S1 tends to maintain a constant voltage to the motor as supply 12 discharges.

Since feedback resistor R59 is connected to the RC timing network for the first timer section in FIG. 11, an increase in the load will increase the supply voltage to the RC timing network, thereby increasing the frequency of the first timer's timing cycle. This increase in frequency also results in an increased switching frequency of switch S1, thereby helping maintain motor speed as the load increases.

While particular embodiments of the present invention have been shown and described, alternate embodiments will be apparent to those skilled in the art and are within the intended scope of the present invention. Therefore, the invention is to be limited only by the following claims.

We claim:

1. A control system for controlling an electric motor in lawn or garden equipment, said electric motor being interconnected with a load, said motor drawing current from and being powered by a battery that outputs a supply signal, said supply signal continuously decreasing as said battery discharges, comprising:
   means for generating a frequency signal at a predetermined frequency;
   means for generating a supply feedback signal functionally related to said supply signal;
   means for sensing the current being drawn by said motor;
   means for generating a load feedback signal functionally related to the magnitude of said sensed motor current;
   pulse width modulation means for receiving said frequency signal, said supply feedback signal, and said load feedback signal, and for outputting a switch control signal at said predetermined frequency whose pulse width is both inversely proportional to said supply signal and directly proportional to the magnitude of said sensed motor current;
   switch means for switching current to said motor in response to said switch control signal; and
   means for increasing the power to said motor when the sensed motor current is greater than a predetermined level.

2. The control system of claim 1, further comprising:
   means for limiting the pulse width of said switch control signal and for resetting said pulse width modulation means if the output pulse width exceeds a predetermined value.

3. The control system of claim 1, further comprising:
   means for reducing said predetermined frequency if the pulse width of said switch control signal exceeds a predetermined value.

4. The control system of claim 3, wherein said reducing means reduces said predetermined frequency by at least one-third.

5. A control system for controlling an electric motor in lawn or garden equipment, said electric motor being interconnected with a load, said motor drawing current from and being powered by a battery that outputs a supply signal, said supply signal continuously decreasing as said battery discharges, said control system comprising:
   means for generating a frequency signal;
   means for generating a supply feedback signal functionally related to said supply signal;
   means for sensing the current being drawn by said motor;
   means for generating a load feedback signal functionally related to the magnitude of said sensed motor current;
   frequency modulation means for receiving said frequency signal, said supply feedback signal, and said load feedback signal, and for outputting a switch control signal having a set pulse width whose frequency is both inversely proportional to said supply signal and directly proportional to the magnitude of said sensed motor current;
   switch means for switching current to said motor in response to said switch control signal; and means for increasing the power to said motor when the sensed motor current is greater than a predetermined level.

6. The control system of claims 1 or 5, wherein said power increasing means includes:
   means for generating a reference signal functionally related to a maximum motor current;
   means for generating a feedback signal functionally related to the actual motor current;
   comparison means for comparing said reference signal to said feedback signal, and for reducing the current supplied to said motor if said feedback signal is greater than said reference signal; and
   means for increasing the magnitude of said reference signal when the actual motor current is greater than a predetermined value.

7. The control system of claim 6, wherein said reference signal generating means includes:
   means for receiving said supply signal; and
   means for increasing said supply signal as said battery discharges to generate a substantially constant reference signal.

8. The control system of claim 7, wherein said supply signal increasing means includes a resistor and a zener diode.

9. The control system of claim 6, wherein said reference signal increasing means includes a resistor-capacitor network connected to the input of the comparison means.

10. The control system of claims 1 or 5, wherein said supply feedback signal generating means includes a feedback resistor.

11. The control system of claims 1 or 5, wherein said frequency signal generating means includes a resistor-capacitor timing network.

12. The control system of claims 1 or 5, wherein said frequency signal generating means includes a monolithic timing circuit.

13. The control system of claims 1 or 5, wherein said frequency signal generating means and said modulation means are contained on a single integrated circuit chip.

14. The control system of claims 1 or 5, wherein said modulation means includes a dual monolithic timing circuit.

15. The control system of claims 1 or 5, wherein said modulation means includes a monolithic timing circuit.

16. The control system of claims 1 or 5, wherein said switch means includes a semiconductor switch.

17. The control system of claims 1 or 5, wherein said means for generating a load feedback signal includes a feedback resistor.

18. The control system of claims 1 or 5, further comprising:
   limiter means for limiting the current to said motor.

19. The control system of claim 18, wherein said limiter means includes:
   means for generating a reference signal functionally related to a maximum motor current; and
   comparison means for comparing said reference signal to said load feedback signal and for decreasing the current being supplied to said motor if said load feedback signal is greater than said reference signal.

20. The control system of claim 19, wherein said comparison means includes an operational amplifier that receives said reference signal and said load feedback signals as inputs.

21. The control system of claim 19, wherein said comparison means decreases the current being supplied to said motor by resetting said modulation means.

22. The control system of claims 1 or 5, further comprising:
   indicator means for indicating when the current being drawn by said motor reaches a predetermined level.

23. The control system of claims 1 or 5, further comprising:
   means for providing charging current to said battery when the voltage of said supply signal is less than a predetermined level.

24. The control system of claim 23, further comprising:
   an indicator that indicates whether the voltage of said supply signal is less than said predetermined level both while said battery is receiving said charging current and while said battery is powering said motor.

25. The control system of claims 1 or 5, further comprising:
   means for increasing the speed of said motor when the current to said motor exceeds a second level.

26. The control system of claims 1 or 5, further comprising:
   means for reducing the speed of said motor when the current to said motor is less than a second level.

27. A control system for controlling an electric motor in lawn or garden equipment, said motor being interconnected with a load, said motor drawing current from and being powered by a battery that outputs a supply signal, said supply signal continuously decreasing as said battery discharges, said control system comprising:
   means for generating a supply feedback signal functionally related to said supply signal;
   means for sensing the current being drawn by said motor;
   means for generating a load feedback signal functionally related to the magnitude of said sensed motor current;
   a timer means, including:
      means for generating a frequency signal at a predetermined frequency;
      pulse width modulation means for receiving said frequency signal, said supply feedback signal, and said load feedback signal, and for outputting a switch control signal at said predetermined frequency whose pulse width is both inversely proportional to said supply signal and directly proportional to the magnitude of said sensed motor current; and
   switch means for switching current to said motor in response to said switch control signal.

28. The control system of claim 27, further comprising:
   means for limiting the pulse width of said switch control signal and for resetting said pulse width modulation means if the output pulse width exceeds a predetermined value.

29. The control system of claim 27, further comprising:
   means for reducing said predetermined frequency if the pulse width of said switch control signal exceeds a predetermined value.

30. The control system of claim 29, wherein said reducing means reduces said predetermined frequency by at least one-third.

31. A control system for controlling an electric motor in lawn or garden equipment, said motor being interconnected with a load, said motor drawing current from and being powered by a battery that outputs a supply signal, said supply signal continuously decreasing as said battery discharges, said control system comprising:
means for generating a supply feedback signal functionally related to said supply signal;
means for sensing the current being drawn by said motor;
means for generating a load feedback signal functionally related to the magnitude of said sensed motor current;
a timer means, including:
means for generating a frequency signal;
frequency modulation means for receiving said frequency signal, said supply feedback signal, and said load feedback signal, and for outputting a switch control signal having a set pulse width whose frequency is both inversely proportional to said supply signal and directly proportional to the magnitude of said sensed motor current; and
switch means for switching current to said motor in response to said switch control signal.

32. The control system of claims 27 or 31, wherein said timer means includes a monolithic timing circuit.

33. The control system of claims 27 or 31, wherein said timer means is on a single integrated circuit chip.

34. The control system of claims 27 or 31, further comprising:
means for increasing the power to said motor when the load applied to said motor is greater than a predetermined level.

35. The control system of claim 29, wherein said power increasing means includes:
means for generating a reference signal functionally related to a maximum motor current;
means for generating a feedback signal functionally related to the sensed motor current;
comparison means for comparing said reference signal to said feedback signal, and for decreasing the current supplied to said motor if said feedback signal is greater than said reference signal; and
means for increasing the magnitude of said reference signal when the sensed motor current is greater than a predetermined value.

36. The control system of claim 35, wherein said reference signal generating means includes:
means for receiving said supply signal; and
means for increasing said supply signal as said battery discharges to generate a substantially constant reference signal.

37. The control system of claim 36, wherein said supply signal increasing means includes a resistor and a zener diode.

38. The control system of claim 35, wherein said reference signal increasing means includes a resistor-capacitor timing network connected to the input of the comparison means that receives said reference signal.

39. The control system of claims 27 or 31, wherein said supply feedback signal generating means includes a feedback resistor.

40. The control system of claims 27 or 31, wherein said frequency signal generating means includes a resistor-capacitor timing network.

41. The control system of claims 27 or 31, wherein said switch means includes a semiconductor switch.

42. The control system of claims 27 or 31, further comprising:
limiter means for limiting the current to said motor.

43. The control system of claim 42, wherein said limiter means includes:
means for generating a reference signal functionally related to a maximum motor current;
means for generating a load feedback signal functionally related to the magnitude of current being drawn by said motor; and
comparison means for comparing said reference signal to said load feedback signal and for decreasing the current being supplied to said motor if said load feedback signal is greater than said reference signal.

44. The control system of claim 43, wherein said comparison means includes an operational amplifier that receives said reference signal and said load feedback signals as inputs.

45. The control system of claim 43, wherein said comparison means decreases the current being supplied to said motor by resetting said modulation means.

46. The control system of claims 27 or 31, further comprising:
indicator means for indicating when the current being supplied to said motor reaches a predetermined level.

47. The control system of claims 27 or 31, further comprising:
means for providing charging current to said battery when the voltage of said supply signal is less than a predetermined level.

48. The control system of claim 47, further comprising:
an indicator that indicates whether the voltage of said supply signal is less than said predetermined level both while said battery is receiving said charging current and while said battery is powering said motor.

49. The control system of claims 27 or 31, further comprising:
means for increasing the speed of said motor when the current to said motor exceeds a second level.

50. The control system of claims 27 or 31, further comprising:
means for reducing the speed of said motor when the current to said motor is less than a second level.

* * * * *